«12» United States Patent
Tsou et al.

(10) Patent No.: US 6,346,369 B1
(45) Date of Patent: *Feb. 12, 2002

(54) SCRATCH RESISTANT LAYER FOR IMAGING ELEMENTS

(75) Inventors: Andy H. Tsou, Houston, TX (US); Charles C. Anderson, Penfield; Joseph S. Sedita, Albion, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,794

(22) Filed: Jun. 3, 1998

(51) Int. Cl.⁷ .............................. G03C 1/76; G03C 1/85
(52) U.S. Cl. ................. 430/523; 430/531; 430/533; 430/536; 430/961
(58) Field of Search ................. 430/523, 531, 430/533, 536, 961

(56) References Cited

U.S. PATENT DOCUMENTS

| 4,394,441 A | * | 7/1983 | Kawaguchi et al. | 430/524 |
|---|---|---|---|---|
| 5,288,598 A | * | 2/1994 | Sterman et al. | 430/496 |
| 5,300,417 A | * | 4/1994 | Lushington et al. | 430/531 |
| 5,366,855 A | * | 11/1994 | Anderson et al. | 430/523 |
| 5,484,694 A | | 1/1996 | Lelental et al. | |
| 5,536,627 A | * | 7/1996 | Wang et al. | 430/523 |
| 5,698,384 A | * | 12/1997 | Anderson et al. | 430/523 |
| 5,723,273 A | * | 3/1998 | Anderson et al. | 430/527 |
| 5,846,699 A | * | 12/1998 | Wang et al. | 430/528 |
| 5,853,926 A | * | 12/1998 | Bohan et al. | 430/14 |
| 5,876,910 A | * | 3/1999 | Anderson et al. | 430/527 |

* cited by examiner

*Primary Examiner*—Janet Baxter
*Assistant Examiner*—Amanda C. Walke
(74) *Attorney, Agent, or Firm*—Doreen M. Wells

(57) ABSTRACT

The present invention is an imaging element which includes a support and at least one imaging layer superposed on the support. The imaging layer includes a scratch resistant outermost layer either overlying the imaging layer or on the side opposite the imaging layer, and is composed of a ductile polymer having a modulus greater than 100 MPa measured at 20° C. and a tensile elongation to break greater than 50 percent, and a stiff filler having a modulus greater than 10 GPa at a volume concentration in the scratch resistant layer of 30 to 60%. The scratch resistant layer has a thickness of at least 0.5 μm.

11 Claims, No Drawings

SCRATCH RESISTANT LAYER FOR IMAGING ELEMENTS

FIELD OF THE INVENTION

This invention relates to imaging elements having an improved scratch resistant layer. In particular, this invention relates to scratch resistant layers comprising a ductile polymer and a hard filler.

BACKGROUND OF THE INVENTION

Microscratches are scratches that are on the order of several microns in width and submicron to microns in depth. They are commonly observed on the front and back sides of photographic films, on photoconductor belts, on thermal prints, and on PhotoCD disks. They are caused by sliding contact of imaging products with dirt particles or other asperities that have micron-sized contact radii. These scratches can affect analog or digital image transfer and degrade the output image quality. Their presence on magnetic or conductive backings could lessen the performance of these functional coatings. Thus, scratch resistance protective coatings on the front or back or both sides of an imaging product are commonly required.

Since all imaging products are based on flexible substrates for ease of transport, conveyance, and manufacturing, hard metallic or ceramic tribological scratch resistant coatings are not suitable due to their mechanical incompatibility with the polymeric flexible substrates. This mechanical incompatibility can cause adhesion failure between the coating and the substrate during scratching. Polymeric coatings are thus preferable as the scratch resistant layer for imaging products. However, with the requirements for high light transmission, low material cost, low internal drying stress, and high coating speeds, the thickness of these scratch resistant coatings is preferably about 10 microns or less.

During micro-scratching of a micron-thick coating, complex stress fields develop in the coating, within which high internal shear stress, interfacial shear stress, and surface tensile stress are present. A coating can fail either by shear fracture, delamination, or tensile cracking depending on the relative shear, adhesive, and tensile strengths of the coating. Using a micro-scratching instrument with a single micron-sized stylus, the resistance to scratch damage for a coating can be measured. Combining this instrument with optical microscopy, the failure mode, such as shear fracture, delamination, or tensile cracking, can be determined. All these failure modes produce scratches that are printable and scanable and, thus, unacceptable for imaging products. A permanent scratch track resulting from plastic deformation of a ductile coating without coating failure is also printable and scanable, and thus, not desirable.

Various types of polymeric coatings have been examined as scratch resistant coatings for imaging products. These include coatings comprising brittle, ductile, elastic-plastic, or rubber-elastic polymeric materials. Brittle polymers with elongations to break less than 5%, such as poly(methyl methacrylate) and poly(styrene) are not desirable as scratch resistant coatings for imaging products. Regardless of the coating thickness, the brittleness of these materials leads to printable surface tensile cracks during scratching. Soft elastomers (rubber-elastic materials), such as urethane rubbers, acrylic rubbers, silicone rubbers, are not suitable as scratch resistant coatings since deep penetration of the asperity or stylus occurs in these soft coatings which causes these elastomeric coatings to fail at low loads during scratching. Using stiff fillers to increase the stiffness of these elastomers to reduce stylus penetration does not solve this problem since permanent and printable scratch tracks result in elastomeric coatings containing stiff fillers by the induced coating plasticity under the presence of stiff fillers.

Ductile elastic-plastic coatings with elongations to break greater than 10%, such as glassy polyurethanes, polycarbonate, cellulose esters, etc., exhibit shear-fracture-type scratch damage during scratching that result from plastic flow. Plastic flow in these ductile coatings during scratching is controlled by the coating thickness. For thin coatings of these materials, plastic flow in the coating during scratching is restricted by the coating adhesion to the substrate leading to a premature failure of the coatings at low loads. Thicker coatings for these materials may have improved resistance to coating failure, however, for imaging products these thicknesses may be impractical. In addition, although thick ductile coatings have improved resistance to coating failure during scratching, the low yield strength and modulus for these materials result in the formation of permanent scratch tracks in the coatings at low loads. As an approach to prevent permanent scratch track formation, the yield strength of a ductile coating can be increased with the addition of stiff fillers. However, with the incorporation of stiff fillers, the elongation to break for these coatings are reduced significantly due to constrained plastic flow which is limited by the filler. This means that although the formation of a permanent scratch track can be delayed to higher loads with the addition of stiff fillers, the load required for coating failure is lowered accordingly. The failure mode is also changed from shear fracture to tensile cracking with the addition of stiff fillers. In addition, with the addition of high concentrations of fillers, the coatings may crack during drying due to the high internal drying stresses.

It can be seen that various approaches have been attempted to obtain an improved scratch resistant layer for imaging products. However, the aforementioned methods have met with only limited success. The present invention provides a coating composition with excellent resistance to the formation of permanent scratch tracks and coating failure when an imaging product is exposed to sharp asperities or other conditions that may lead to scratches during the manufacture and use of the imaging product.

SUMMARY OF THE INVENTION

The present invention is an imaging element which includes a support and at least one imaging layer superposed on the support. The imaging layer includes a scratch resistant outermost layer either overlying the imaging layer or on the side opposite the imaging layer, and is composed of a ductile polymer having a modulus greater than 100 MPa measured at 20° C. and a tensile elongation to break greater than 50 percent, and a stiff filler having a modulus greater than 10 GPa at a volume concentration in the scratch resistant layer of 30 to 60%. The scratch resistant layer has a thickness of at least 0.5 µm.

DETAILED DESCRIPTION OF THE INVENTION

The imaging elements of this invention can be of many different types depending on the particular use for which they are intended. Such elements include, for example, photographic, electrostatographic, photothermographic, migration, electrothermographic, dielectric recording and thermal-dye-transfer imaging elements. Imaging elements can comprise any of a wide variety of supports. Typical supports include cellulose nitrate film, cellulose acetate film, poly(vinyl acetal) film, polystyrene film, poly(ethylene terephthalate) film, poly(ethylene naphthalate) film, polycarbonate film, glass, metal, paper, polymer-coated paper, and the like.

Details with respect to the composition and function of a wide variety of different imaging elements are provided in U.S. Pat. No. 5,340,676 and references described therein. The present invention can be effectively employed in conjunction with any of the imaging elements described in the '676 patent.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994 and Research Disclosure, Item 38597, September 1996.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and Research Disclosure, Item 38597, September 1996 and the references listed therein.

The photographic silver halide emulsions utilized in this invention can contain other addenda conventional in the photographic art. Useful addenda are described, for example, in Research Disclosure, Item 36544, September, 1994 and Research Disclosure, Item 38597, September 1996. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The photographic processing steps to which the raw film may be subject may include, but are not limited to the following:

1.) color developing→bleach→fixing→washing/stabilizing;

2.) color developing→bleaching→fixing→washing/stabilizing;

3.) color developing→bleaching→bleach→fixing→washing/stabilizing;

4.) color developing→stopping→washing→bleaching→washing→fixing→washing/stabilizing;

5.) color developing→bleach-fixing→fixing washing/stabilizing;

6.) color developing→bleaching bleach-fixing→fixing →washing/stabilizing;

Among the processing steps indicated above, the steps 1), 2), 3), and 4) are preferably applied. Additionally, each of the steps indicated can be used with multistage applications as described in Hahm, U.S. Pat. No. 4,719,173, with co-current, counter-current, and contraco arrangements for replenishment and operation of the multistage processor.

Any photographic processor known to the art can be used to process the photosensitive materials described herein. For instance, large volume processors, and so-called minilab and microlab processors may be used. Particularly advantageous would be the use of Low Volume Thin Tank processors as described in the following references: WO 92/10790; WO 92/17819; WO 93/04404; WO 92/17370; WO 91/19226; WO 91/12567; WO 92/07302; WO 93/00612; WO 92/07301; WO 02/09932; U.S. Pat. No. 5,294,956; EP 559,027; U.S. Pat. No. 5,179,404; EP 559,025; U.S. Pat. No. 5,270,762; EP 559,026; U.S. Pat. No. 5,313,243; U.S. Pat. No. 5,339,131.

The present invention is also directed to photographic systems where the processed element may be re-introduced into the cassette. These systems allow for compact and clean storage of the processed element until such time when it may be removed for additional prints or to interface with display equipment. Storage in the roll is preferred to facilitate location of the desired exposed frame and to minimize contact with the negative. U.S. Pat. No. 5,173,739 discloses a cassette designed to thrust the photographic element from the cassette, eliminating the need to contact the film with mechanical or manual means. Published European Patent Application 0 476 535 A1 describes how the developed film may be stored in such a cassette.

The scratch resistant layer of the invention is the outermost layer on the front or back side of the imaging element and comprises a ductile polymer and a stiff filler. The ductile polymer is further defined as a polymer having a modulus measured at 20° C. which is greater than 100 MPa and a tensile elongation to break greater than 50%. The modulus and tensile elongation to break for a polymer film can be conveniently measured by the tensile testing method in accordance with ASTM D882. The stiff filler is defined as a filler material having a modulus greater than 10 GPa. The stiff filler is incorporated in the scratch resistant layer at a volume concentration of 30 to 60%. This combination of a ductile polymer with these modulus and elongation to break values and a stiff filler provide a dried layer having exceptional resistance to the formation of printable, permanent scratch tracks and to scratches caused by complete coating failure during the manufacture and use of the imaging element. In a preferred embodiment, the scratch resistant layer of the invention is applied on the side of the imaging element opposite to the image forming layer.

Ductile polymers that meet the requirements of the present invention include polycarbonate, glassy polyurethanes and polyolefins. Glassy polymers such as polymethyl methacrylate, styrene, and cellulose esters, that have been described for use as scratch resistant layers for imaging elements are not desirable for use in the present invention due to their brittleness, especially when they are used in combination with stiff fillers. Of the ductile polymers useful in the present invention, polyurethanes are preferred due to their availability and excellent coating and film forming properties. In a most preferred embodiment of this invention, the polyurethane is a water dispersible polyurethane.

Water dispersible polyurethanes are well known and are prepared by chain extending a prepolymer containing terminal isocyanate groups with an active hydrogen compound, usually a diamine or diol. The prepolymer is formed by reacting a diol or polyol having terminal hydroxyl groups with excess diisocyanate or polyisocyanate. To permit dispersion in water, the prepolymer is functionalized with hydrophilic groups. Anionic, cationic, or nonionically stabilized prepolymers can be prepared.

Anionic dispersions contain usually either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized prepolymers can be prepared by the use of diol or diisocyanate co-monomers bearing pendant polyethylene oxide chains. These result in polyurethanes with stability over a wide range of pH. Nonionic and anionic groups may be combined synergistically to yield "universal" urethane dispersions. Of the above, anionic polyurethanes are by far the most significant.

One of several different techniques may be used to prepare polyurethane dispersions. For example, the prepolymer may be formed, neutralized or alkylated if appropriate, then chain extended in an excess of organic solvent such as acetone or tetrahydrofuran. The prepolymer solution is then diluted with water and the solvent removed by distillation. This is known as the "acetone" process. Alternatively, a low molecular weight prepolymer can be prepared, usually in the presence of a small amount of solvent to reduce viscosity, and chain extended with diamine just after the prepolymer is dispersed into water. The latter is termed the "prepolymer mixing" process and for economic reasons is much preferred over the former.

Polyols useful for the preparation of polyurethane dispersions include polyester polyols prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as the aforementioned alkyl acrylate or methacrylates with ethylenically unsaturated monomers containing functional groups such as carboxyl, hydroxyl, cyano groups and/or glycidyl groups.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cycopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersibility are trimethylamine, triethylamine, dimethylaniline, diethylaniline, triphenylamine and the like.

Diamines suitable for chain extension of the polyurethane include ethylenediamine, diaminopropane, hexamethylene diamine, hydrazine, amnioethylethanolamine and the like.

Solvents which may be employed to aid in formation of the prepolymer and to lower its viscosity and enhance water dispersibility include methylethylketone, toluene, tetrahydofuran, acetone, dimethylformamide, N-methylpyrrolidone, and the like. Water-miscible solvents like N-methylpyrrolidone are much preferred.

Various stiff fillers that have a modulus greater than 10 GPa may be used in the scratch resistant layer of the present invention, representative stiff fillers include colloidal silica, colloidal tin oxide, colloidal titanium dioxide, mica, clays, doped-metal oxides, metal oxides containing oxygen deficiencies, metal antimonates, conductive nitrides, carbides, or borides, for example, $TiO_2$, $SnO_2$, $Al_2O_3$, $ZrO_3$, $In_2O_3$, MgO, $ZnSb_2O_6$, $InSbO_4$, $TiB_2$, $ZrB_2$, $NbB_2$, $TaB_2$, $TaB_2$, $CrB_2$, MoB, WB, $LaB_6$, ZrN, TiN, TiC, and WC. Preferably, the stiff filler has a refractive index less than or equal to 2.1, and most preferably less than or equal to 1.6. For thick scratch resistant coatings, i.e., for dried layer thicknesses between 0.6 and 10 $\mu$m containing 30 to 60 volume % stiff filler it is important to limit the refractive index of the filler in order to provide good transparency of the layer. The filler also has a particle size less than or equal to 500 nm, and preferably, less than 100 nm.

At filler concentrations less than 30 volume % there is little improvement in the scratch resistance of the layer while for filler concentrations greater than 60 volume % the layer becomes too brittle and the coating may exhibit cracking due to drying induced stresses. The filler concentration is specified in terms of volume % rather than weight % since the density of the filler particles can vary widely, for example, from about 1.5 g/cm$^3$ to as much as 7 g/cm$^3$.

Layers containing hard fillers for use in imaging elements have been described in the prior art. For example in U.S. Pat. No. 5,204,233, a silica-containing gelatin layer is described which reportedly has reduced sticking propensity. However, since gelatin does not have an elongation to break greater than 50%, the addition of hard fillers such as silica actually embrittles the layer. Backing layers comprising cellulose esters, styrene, or acrylate polymers and colloidal silica or alumina fillers are described in U.S. Pat. Nos. 4,363,871, 4,4427,764, 4,582,784, 4,914,018, 5,019,491, 5,108,885, 5,135,846, 5,250,409, and European Patent Appl. EP 296656, for example. However, these prior art references describe coating compositions comprising polymers with low elongation to break values and/or low modulus values and so they do not obtain the significant improvements in scratch resistance obtained in the present invention. In addition, these aforementioned prior art references do not teach or suggest that the polymers used in these coatings must have specific elongation to break and modulus values in order to optimize the physical properties of the dried layer.

Antistatic layers containing hard, electrically-conductive fillers such as doped-metal oxides, metal antimonates, etc. have been described in, for example, U.S. Pat. Nos. 4,275,103, 4,394,441, 4,416,963, 4,418,141, 4,431,764, 4,495,276, 4,571,361, 4,999,276, 5,122,445, 5,368,995, 5,457,013, 5,340,676, and in commonly assigned copending application Ser. No. 08/847,634. In these antistatic layer compositions, the binder for the conductive filler is typically not critical and various polymers including gelatin, latex polymers prepared from ethylenically unsaturated monomers, and others are described as being useful in the layer. These references do not teach the use of a polymer binder in which the elongation to break and modulus are critical to the performance of the layer. In addition, since these fillers typically have a high refractive index, it is usually desirable to apply these layers as thin as possible to provide good transparency. In commonly assigned copending application Ser. No. 08/937,685 and 08/940,960, antistatic layers containing a smectite clay and a polymer binder are described. Suitable polymers are described as those which exfoliate the clay. These patent applications do not teach the use of polymer binders having specific elongation to break or modulus values to obtain improved scratch resistance.

In addition to the ductile polymer having a modulus greater than 100 MPa and an elongation to break greater than 50% and a stiff filler having a modulus greater than 10 GPa, the scratch resistant layers in accordance with the invention may also contain suitable crosslinking agents including aldehydes, epoxy compounds, polyfunctional aziridines, vinyl sulfones, methoxyalkyl melamines, triazines, polyisocyanates, dioxane derivatives such as dihydroxydioxane, carbodiimides, and the like. The crosslinking agents react with the functional groups present on the ductile polymer. The thickness of the scratch resistant layer is preferably at least 0.5 $\mu$m.

Other additional compounds that can be employed in the scratch resistant layer compositions of the invention include surfactants, coating aids, coalescing aids, lubricants, dyes, biocides, UV and thermal stabilizers, and matte particles. Matte particles are well known in the art and have been described in Research Disclosure No. 308, published December 1989, pages 1008 to 1009. When polymer matte particles are employed, the polymer may contain reactive functional groups capable of forming covalent bonds with the ductile polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

Lubricants useful in the coating composition of the present invention include (1) silicone based materials disclosed, for example, in U.S. Pat. Nos. 3,489,567, 3,080, 317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc disclosed in U.S. Pat. Nos. 2,454,043, 2,732,305, 2,976, 148, 3,206,311, 3,933,516, 2,588,765, 3,121,060, 3,502,473, 3,042,222, and 4,427,964, in British Patent Nos. 1,263,722, 1,198,387, 1,430,997, 1,466,304, 1,320,757, 1,320,565, and 1,320,756, and in German Patent Nos. 1,284,295 and 1,284, 294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly(tetrafluoroethlyene), poly(trifluorochloroethylene), poly(vinylidene fluoride, poly(trifluorochloroethylene-co-vinyl chloride), poly(meth)acrylates or poly(meth) acrylamides containing perfluoroalkyl side groups, and the like. Lubricants useful in the present invention are described in further detail in Research Disclosure No.308, published December 1989, page 1006.

As part of the present invention it is also contemplated to overcoat the scratch resistant layer with a thin lubricant layer. An example of a particularly useful lubricant layer for the purpose of the invention is a layer of camauba wax.

The coating compositions of the invention can be applied by any of a number of well-know techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308, Published December 1989, pages 1007 to 1008.

EXAMPLES

The polymers and fillers used in the following example and comparative coatings are described in Table 1.

TABLE 1

| Designation | Description | Material* | Modulus | Elongation to Break, % |
|---|---|---|---|---|
| P-1 | Polymer | Witcobond 232 Polyurethane | 710 MPa | 150 |
| P-2 | Polymer | Witcobond 242 Polyurethane | 503 MPa | 50 |
| P-3 | Polymer | Sancure 12684 Polyurethane | 593 MPa | 320 |
| P-4 | Polymer | Sancure 2191-018-122A Polyurethane | 800 MPa | 179 |
| P-5 | Polymer | Sancure 815D Polyurethane | 1,241 MPa | 220 |
| P-6 | Polymer | Poly(methylmethacrylate-co-methacrylic acid 80/20 | 2,900 Mpa | 2 |
| P-7 | Polymer | Elvacite 2041 Poly(methylmethacrylate) | 3,000 MPa | 2 |
| F-1 | Filler | Ludox AM | >10 GPa | — |
| F-2 | Filler | Poly(n-butyl acrylate-co-methacrylic acid 90/10 latex | <0.1 GPa | — |

*Witcobond Polyurethanes listed are water-dispersible polyurethanes available from Witco Corp.
*Sancure Polyurethanes listed are water-dispersible polyurethanes available from B. F. Goodrich Corp.
*Elvacite Poly(methyl methacrylate) is solvent-coated poly(methyl methacrylate) from ICI Acrylics Inc.

Scratch resistant layer coating compositions comprising various polymers and hard fillers were applied onto a polyester film support that had been previously coated with a vinylidene chloride-containing subbing layer. The backing layers were applied at a dry coating thickness of 0.1 to 5 µm.

A micro-scratch tester was employed to measure the scratch resistance of these scratch resistant coatings. Using a conical diamond stylus of 3-micron radius, each coating was scratched over a load range of 0 to 30 mN. For a coating to meet all the requirements of a scratch resistant layer, it must not undergo coating failure below 10 mN and must not give printable scratches at 5 mN. The results of scratching at a 10 mN load are shown in Table 2. In the table, the resistance to coating failure due to scratching is summarized for a variety of polymers without fillers; the mark O indicates no coating failure, the mark Δ indicates some coating damage, and the mark X indicates unacceptable, severe coating damage.

TABLE 2

| Polymer | Thickness (µm) | Elongation to Break (%) | Coating Failure |
|---|---|---|---|
| P-7 | 1.0 | 2 | X |
| P-6 | 0.1 | 2 | X |
| P-6 | 0.5 | 2 | X |
| P-6 | 1.0 | 2 | X |
| P-6 | 5.0 | 2 | X |
| P-2 | 1.0 | 50 | Δ |
| P-1 | 0.1 | 150 | X |
| P-1 | 0.5 | 150 | Δ |
| P-1 | 1.0 | 150 | O |
| P-1 | 5.0 | 150 | O |
| P-4 | 1.0 | 179 | O |
| P-5 | 1.0 | 220 | O |
| P-3 | 1.0 | 320 | O |

As indicated in Table 2, for a scratch resistant layer on an imaging product to be resistant to coating damage, its elongation to break must be greater than 50% and its thickness must be greater than 0.5 µm. In an attempt to increase the ductility of a brittle coating (a coating with elongation to break less than 5%, such as Polymer P-6 and P-7), a soft filler, such as the F-3 filler, was added to the P-6 polymer. As shown in Table 3, the addition of a soft filler did not improve the coating strength.

TABLE 3

| Sample | Polymer | Thickness (µm) | Filler | Filler Volume % | Coating Failure |
|---|---|---|---|---|---|
| Comparative Sample A | P-6 | 0.1 | F-2 | 25 | X |
| Comparative Sample B | P-6 | 0.1 | F-2 | 50 | X |
| Comparative Sample C | P-6 | 1.0 | F-2 | 25 | X |
| Comparative Sample D | P-6 | 1.0 | F-2 | 50 | X |

In addition to the requirement that a coating not fail during scratching at a 10 mN scratch load, a scratch resistant layer on an imaging product must not have observable and printable scratches when it is scratched at a load of 5 mN. Using a Nikon LS1000 slide/negative scanner, scratches generated on a 1 µm thick coating at a 5 mN load were evaluated for printability. Results of the scratch printability evaluation are summarized in Table 4 for ductile polymers P-1, P-3, P-4, and P-5, which gave excellent resistance to coating failure in Table 2, and brittle polymer P-6, which had poor resistance to coating failure in Table 2, with various volume % hard filler added. In Table 4, the scratch printability mark O represents no observable scratches, the scratch printability mark ⊕ represents barely visible scratches (this still represents acceptable performance in this test), and the scratch printability mark X represents highly visible scratches (this represents unacceptable performance in this test). In addition, these coatings were also evaluated for the degree of coating failure at a scratch load of 10 mN as previously described.

TABLE 4

| Sample | Polymer | Filler | Filler Volume % | Coating Failure | Scratch Printability |
|---|---|---|---|---|---|
| Comparative Sample E | P-6 | F-1 | 50 | X | X |
| Comparative Sample F | P-1 | F-1 | 0 | O | X |
| Comparative Sample G | P-1 | F-1 | 10 | O | X |
| Comparative Sample H | P-1 | F-1 | 15 | O | X |
| Comparative Sample I | P-1 | F-1 | 20 | O | X |
| Comparative Sample J | P-1 | F-1 | 25 | O | X |
| Example 1 | P-1 | F-1 | 30 | O | ⊕ |
| Example 2 | P-1 | F-1 | 40 | O | O |
| Example 3 | P-1 | F-1 | 50 | O | O |
| Comparative Sample K | P-1 | F-1 | 65 | Δ* | O |
| Comparative Sample L | P-3 | F-1 | 0 | O | X |
| Example 4 | P-3 | F-1 | 30 | O | ⊕ |
| Example 5 | P-3 | F-1 | 50 | O | O |
| Comparative Sample M | P-4 | F-1 | 0 | O | X |
| Example 6 | P-4 | F-1 | 30 | O | ⊕ |
| Example 7 | P-4 | F-1 | 50 | O | O |
| Comparative Sample N | P-5 | F-1 | 0 | O | X |
| Example 8 | P-5 | F-1 | 30 | O | ⊕ |
| Example 9 | P-5 | F-1 | 50 | O | O |
| Comparative Sample O | P-1 | F-2 | 50 | O | X |

*cracks on the coating surface resulting from drying stresses

As indicated in Table 4, only coating compositions of the invention comprising a ductile polymer having an elongation to break greater than 50% and a modulus of greater than 100 MPa and a stiff filler added at a volume concentration equal to 30 to 60% (i.e., Examples 1 to 9) gave acceptable resistance to both coating failure and printable scratches. For coatings comprising ductile polymers having an elongation to break greater than 50% and a modulus greater than 100 MPa, addition of a stiff filler at a volume concentration less than 30% (i.e., Comparative Samples F to J and L to N) did not give acceptable resistance to printable scratches. For stiff filler volume concentrations greater than 60% (i.e., Comparative Sample K), cracking occurred in the coating during the drying process. For these ductile polymers, addition of soft filler (i.e., Comparative Sample O) did not improve the resistance to printable scratches. Coatings comprising brittle polymer P-6 and a stiff filler (i.e., Comparative Sample E) gave unacceptable resistance to coating failure and printable scratches.

The invention has been described in detail with particular reference to certain preferred embodiments thereof, but it will be understood that variations and modifications can be effected within the spirit and scope of the invention.

What is claimed is:

1. An imaging element comprising:

a support;

at least one imaging layer superposed on the support; and a scratch resistant outermost layer superposed on the support comprising a ductile polymer having a modulus greater than 100 MPa measured at 20° C. and a tensile elongation to break greater than 50 percent, and a stiff filler having a particle size less than 100 nm and a modulus greater than 10 Gpa at a volume concentration in the scratch resistant layer of 30 to 50%, wherein the scratch resistant layer has a thickness of at least 0.5 μm.

2. The imaging element of claim 1 wherein the ductile polymer is selected from the group consisting of polycarbonates, glassy polyurethanes and polyolefins.

3. The imaging element of claim 1 wherein the stiff filler is selected from the group consisting of colloidal silica, colloidal tin oxide, colloidal titanium dioxide, mica, clays, doped-metal oxides, metal oxides containing oxygen deficiencies, metal antimonates, conductive nitrides, carbides and borides.

4. The imaging element of claim 1 wherein the stiff filler has a refractive index less than or equal to 2.1.

5. The imaging element of claim 1 wherein the scratch resistant outermost layer further comprises crosslinking agents, surfactants, coating aids, coalescing aids, lubricants, dyes, biocides, UV stabilizers, thermal stabilizers, and matte particles.

6. The imaging element of claim 1 wherein the support is selected form the group consisting of cellulose nitrate film, cellulose acetate film, poly(vinyl acetal) film, polystyrene film, poly(ethylene terephthalate) film, poly(ethylene naphthalate) film, polycarbonate film, glass, metal, paper and polymer-coated paper.

7. The imaging element of claim 1 wherein the scratch resistant layer overlies the at least one imaging layer.

8. The imaging element of claim 1 wherein the scratch resistant outermost layer is superposed on a side opposite the at least one imaging layer.

9. An imaging element of claim 1 wherein the imaging element is a photographic element.

10. The imaging element of claim 1 wherein the scratch resistant layer has a dried layer thickness between 0.6 and 10 μm.

11. An imaging element of claim 1 wherein the stiff filler has a refractive index less than or equal to 1.6.

* * * * *